UNITED STATES PATENT OFFICE 2,140,780

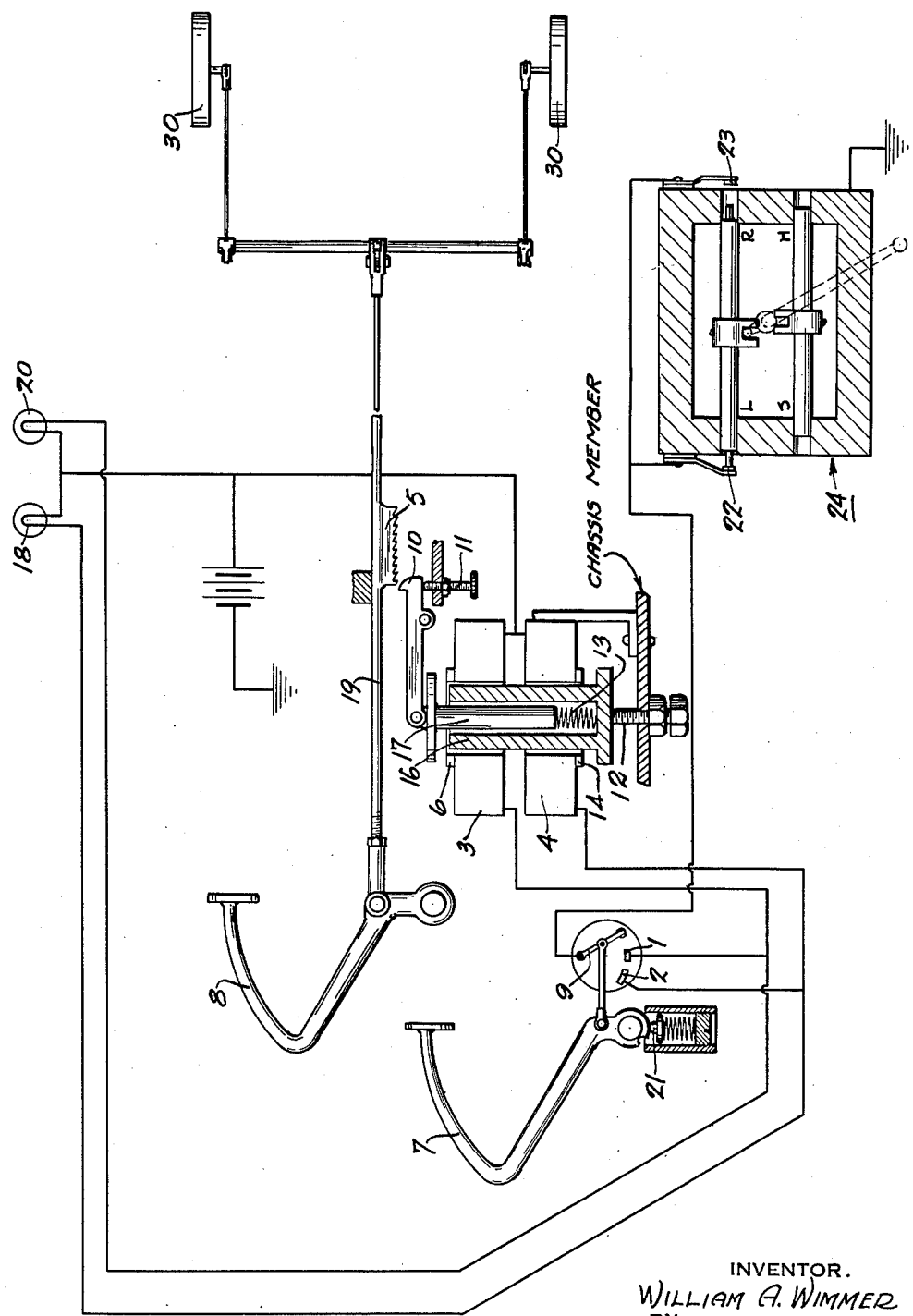

BRAKE

William A. Wimmer, Long Beach, Calif.

Application May 28, 1937, Serial No. 145,189

1 Claim. (Cl. 192—4)

This invention relates to brakes for automotive vehicles and is especially concerned with an automatic device by which the brakes are held applied when it is desired that the automotive vehicle be held on a hill.

One of the objects of the invention is the provision of an automatic hill hold brake control which will be operative independent of the engine of the vehicle.

One practice in the installation of such a device is to derive the motive power for operating the device from a vacuum chamber connected to the exhaust manifold of the automobile. In such cases the hill holder is likely to become useless and will become useless when the engine stalls. The present invention provides a hill holder which is electrically operated, thus making it completely independent of the operation of the engine. In general the device comprises a locking ratchet and pawl arrangement on the brake arm operated by two solenoid magnets, one of which engages the pawl, while the other is adapted to release it when no longer needed. Control switches on the gear transmission permit operation of the device only when the gears are in low or reverse position. The actuating switch is operated by an extreme forward movement of the clutch pedal so that nominal pressure on the clutch pedal does not affect the mechanism.

Further objects and features of the invention will be apparent from a consideration of this specification when taken in connection with the accompanying drawing in which:

The figure is a diagrammatic view of a typical installation of the device with a wiring diagram.

The gear transmission indicated at 24 has contact elements 22 and 23 adapted to complete the circuit only when the gears are in the positions of low or reverse, it being assumed that only under conditions calling for the use of those gears would the driver desire the cooperation of the hill holder device. The retention of brakes 30 operated through the usual linkage by the foot pedal 8 is accomplished by a ratchet 5 on the under side of the main brake hookup link 19 adapted to be engaged by pawl 10. This pawl is removed by pivotal connection with plunger 17, actuated by the solenoid magnets 3 and 4. These magnets are energized by a flow of electricity from the battery of the car through switch points 1 and 2, the contact arm 9 of which is thrown by movement of the clutch pedal. Adjustment of these switch points is to be so regulated that an extreme forward depression of that pedal is necessary to contact point 2 which energizes magnet 4 and pulls the plunger down, engaging the pawl with the ratchet. Obviously this engagement will only occur when both brake and clutch pedals are simultaneously depressed, as in bringing the vehicle to a full stop. A stop button 21 is spring mounted to press against the end of the clutch pedal and assists in securing the proper adjustment of the contacts 1 and 2 and aids the driver by keeping clutch pedal sweep within regulated limits, unless otherwise desired. Set screw 11 permits adjustment of the height of the pawl and set screw 12 acts through casing plunger 16 against compression spring 13 to adjust the tripping plunger 17. Rubber cushions 6 and 14 silence the movement of the plungers.

In use, the driver depresses both brake and clutch pedals to the utmost, which establishes contact and solenoid 4 moves plunger 17 and the pawl into engagement with the ratchet, providing of course, that the gears are in the proper engagement as described above. The brake pedal may then be released, freeing the foot for other purposes. When the car is to be moved forward or to the rear, the clutch pedal is released in a normal manner, and switch point 1 energizes solenoid 3 which snaps plungers 16 and 17 upward and frees the pawl from the ratchet. This device may be used in conjunction with any type of brake, and employs no extra attachments to distract the attention of the driver. Warning lights 18 and 20 on the dash may be used to inform the driver when the brakes are applied or released, but are not essential.

This electric hill hold brake control device is unquestionably a forward step in the eventual perfection of such mechanisms. It is singularly simple in construction and installation, and demands little of the driver in operation, yet is at all times under his control. It is equally effective whether the car is to be held against forward or backward movement. Installation may be made as part of the original equipment, or added as an accessory.

It is to be understood that the above described improvement is for the purpose of illustration only and various changes may be made therein without departing from the scope of the invention.

I claim:

For use in an automobile, in combination, a brake; means for applying said brake; means for holding the brake applied; adjustable means including an electrical circuit and means dependent on the setting of the gearshift lever and including a rack and a pawl for cooperating with said rack for controlling said holding means, said circuit being completed when the gear shifting lever is in first gear or in reverse; and means including an electrical circuit and depending on the setting of the clutch pedal for controlling the holding means; and means for limiting the return position of said pawl.

WILLIAM A. WIMMER.